United States Patent [19]

Kakuda

[11] Patent Number: 5,497,276
[45] Date of Patent: Mar. 5, 1996

[54] DISK DRIVE ARRAY SYSTEM HAVING INTERNAL SYNCHRONIZATION AND EXTERNAL SYNCHRONIZATION MONITORING

[75] Inventor: Masatoshi Kakuda, Kanagawa, Japan

[73] Assignee: Mitsubishi Denki Kabushiki Kaisha, Tokyo, Japan

[21] Appl. No.: 910,641

[22] Filed: Jul. 8, 1992

[30] Foreign Application Priority Data

Jul. 11, 1991  [JP]  Japan .................. 3-171216

[51] Int. Cl.[6] .......................................... G11B 15/46
[52] U.S. Cl. .................. 360/73.03; 360/73.02; 364/47; 364/50
[58] Field of Search ................. 360/73.03, 70, 360/71, 73.02, 36.1, 37.1, 15; 369/47, 50; 358/342

[56] References Cited

U.S. PATENT DOCUMENTS

| | | | |
|---|---|---|---|
| 4,811,126 | 3/1989 | Suzuki et al. | 360/57 |
| 4,890,045 | 12/1989 | Ishizuka | 260/73.03 |
| 5,089,900 | 2/1992 | Yokogawa | 360/73.03 |
| 5,237,466 | 8/1993 | Glaser et al. | 360/73.02 |
| 5,289,448 | 2/1994 | Sato | 369/50 |

FOREIGN PATENT DOCUMENTS

| | | |
|---|---|---|
| 0276744 | 8/1988 | European Pat. Off. . |
| 0332099 | 9/1989 | European Pat. Off. . |
| 0404120 | 12/1990 | European Pat. Off. . |
| 60-134466 | 8/1985 | Japan . |
| 60-195773 | 10/1985 | Japan . |
| 4053060 | 2/1992 | Japan . |

Primary Examiner—Andrew L. Sniezek
Assistant Examiner—Varsha A. Kapadia
Attorney, Agent, or Firm—Wolf, Greenfield & Sacks

[57] ABSTRACT

A disk drive array system includes a plurality of disk drives. Each disk drive includes a period detector for monitoring the period of a common external synchronizing signal. When the period detector determines the existence of an irregularity in the external synchronizing signal, an internal synchronizing signal, generated by an internal generator, is used for controlling the rotation of each of the disks so as to continue the operation of the disks.

18 Claims, 12 Drawing Sheets

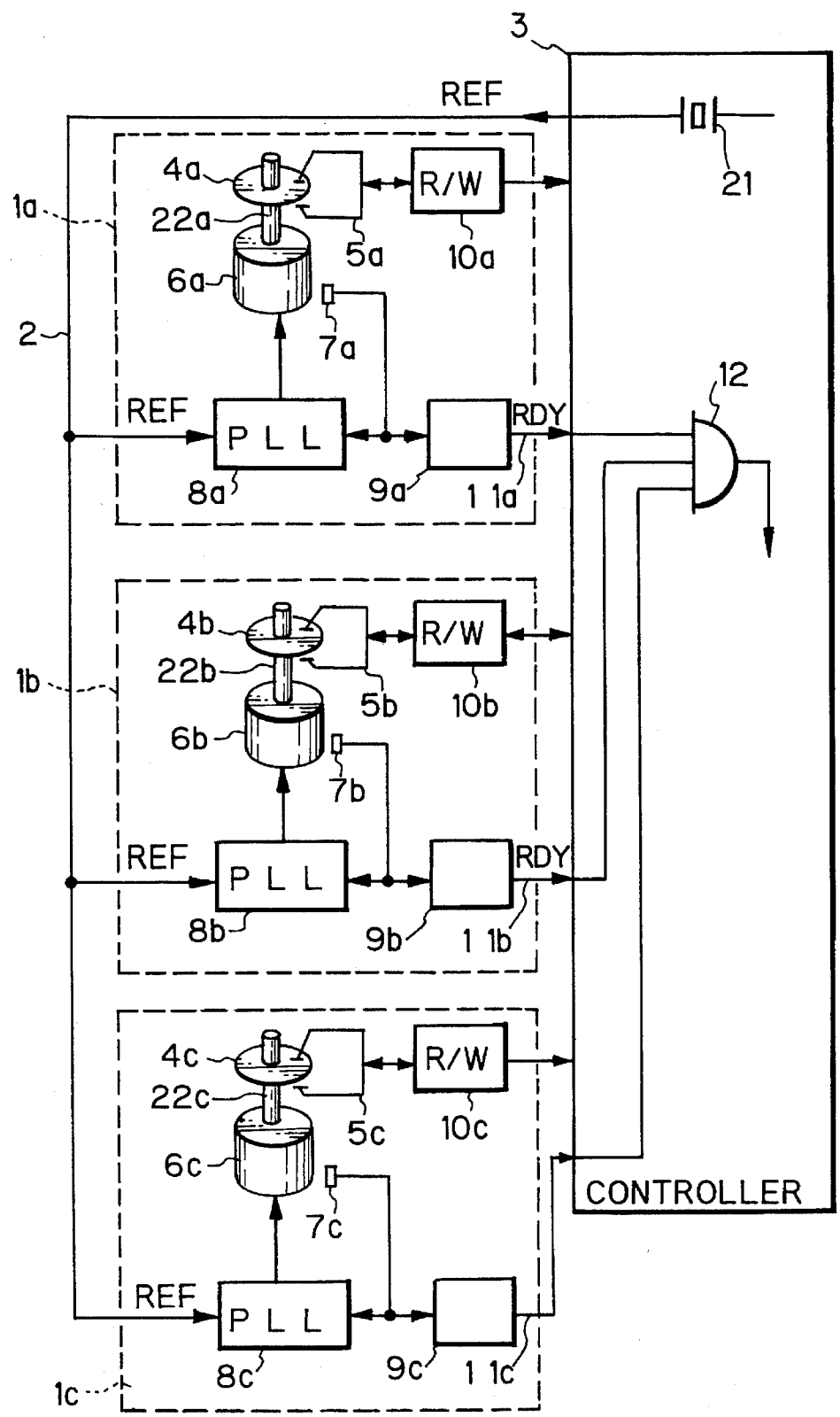

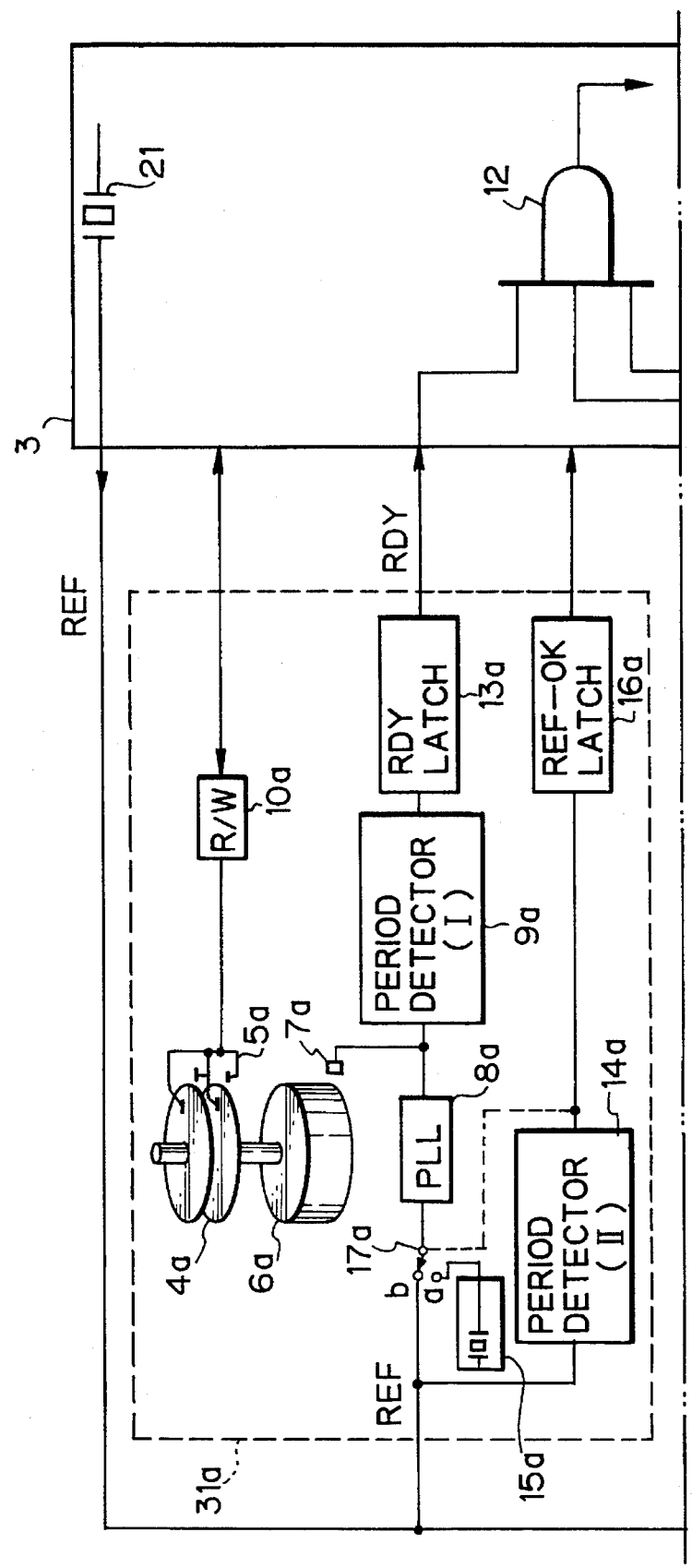

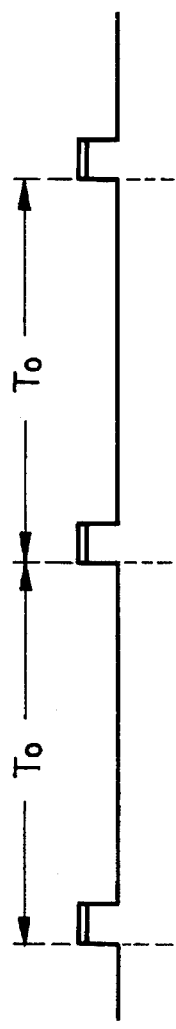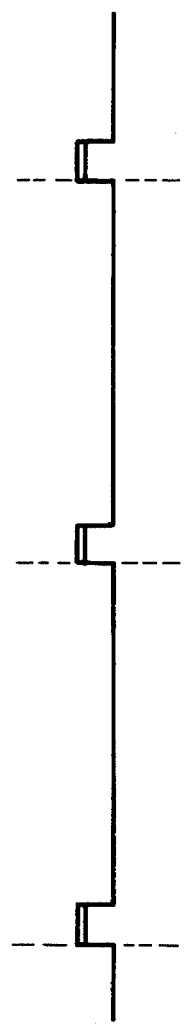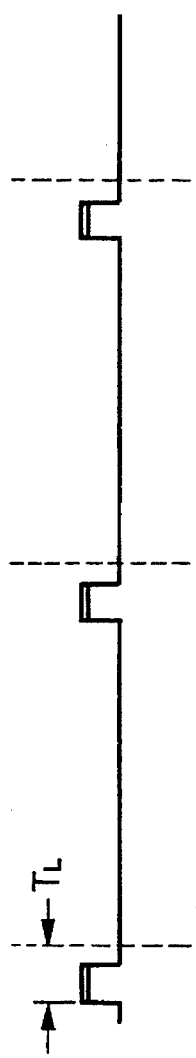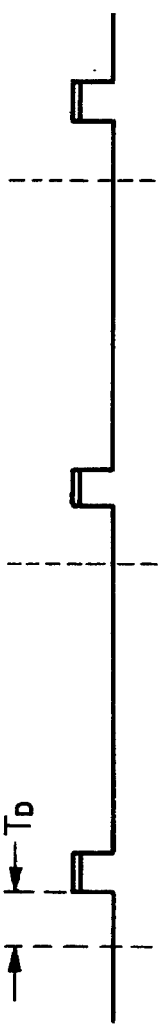
Fig. 4a EXTERNAL SYNCHRONIZING SIGNAL 2 (NORMAL)
Fig. 4b OUTPUT OF INDEX SENSOR 7 (PHASE LOCKED)
Fig. 4c OUTPUT OF INDEX SENSOR 7 (PHASE LEAD)
Fig. 4d OUTPUT OF INDEX SENSOR 7 (PHASE LAG)

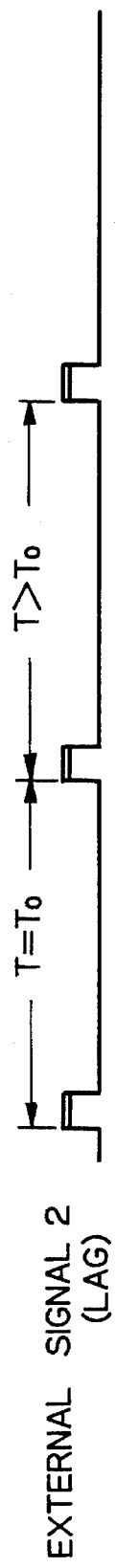
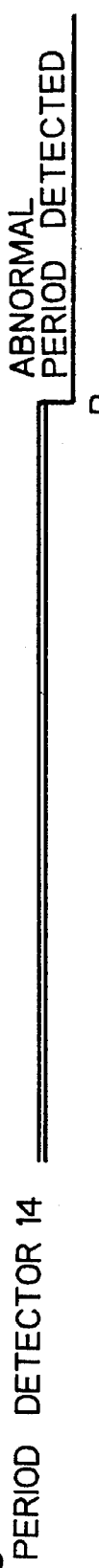
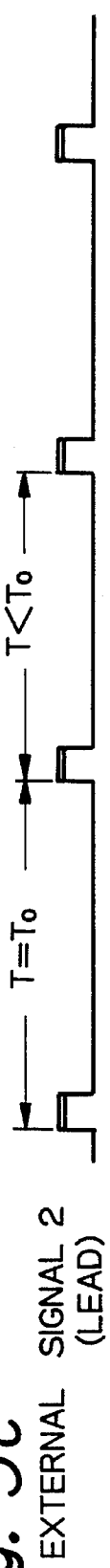
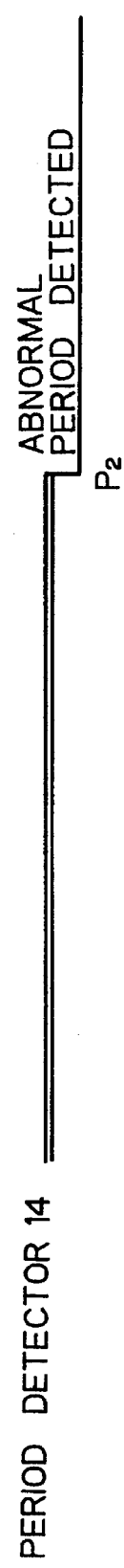
Fig. 5a EXTERNAL SIGNAL 2 (LAG)
Fig. 5b PERIOD DETECTOR 14
Fig. 5c EXTERNAL SIGNAL 2 (LEAD)
Fig. 5d PERIOD DETECTOR 14

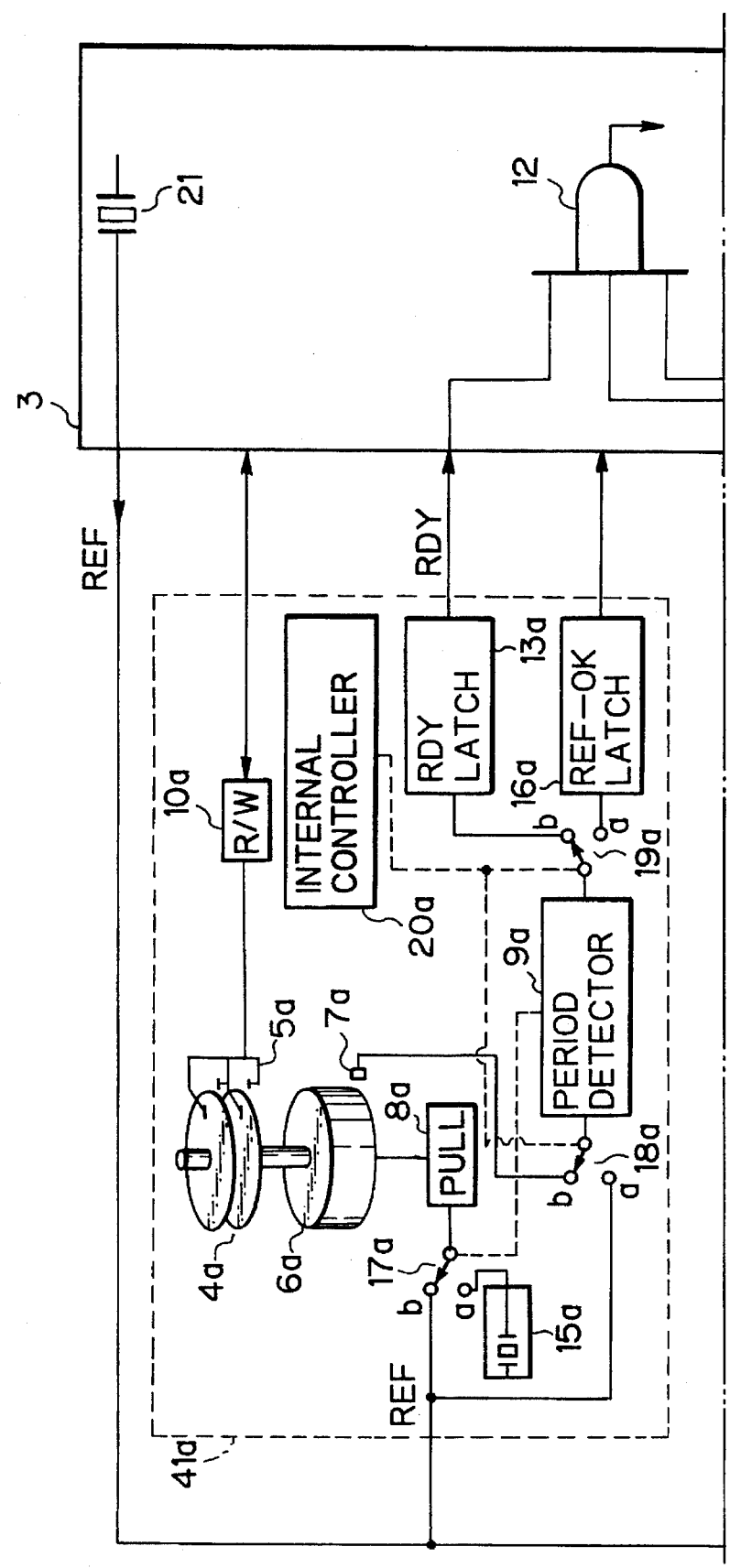

DISK DRIVE ARRAY SYSTEM HAVING INTERNAL SYNCHRONIZATION AND EXTERNAL SYNCHRONIZATION MONITORING

BACKGROUND OF THE INVENTION:

1. Field of the Invention

This invention pertains generally to a disk drive array system used as an external storage unit for a data processing system and, more particularly, to a system for monitoring and controlling synchronization of the rotation of a plurality of disks in a disk drive array system.

2. Prior Art

FIG. 1 shows a conventional disk drive array system having three magnetic disk drives 1a–1c. The magnetic disk drives 1a–1c are each provided with a common external synchronizing signal 2 from a controller 3. The common external synchronizing signal 2 is generated using a suitable oscillator 21 and is used to ensure that each of the disk drives 1a–1c are operating in synchronization with its counterparts. Synchronization of the disk drives 1a–1c enables parallel data transfer and improved performance. The external synchronizing signal 2 is produced once for each synchronous revolution of the disk drives 1a–1c.

Each of the magnetic disk drives 1a–1c includes a magnetic disk 4a, 4b and 4c, for recording information magnetically, a magnetic head 5a, 5b and 5c, for recording and reproducing information from its magnetic disk, a spindle 22a, 22b and 22c on which its magnetic disk rests, a spindle motor 6a, 6b and 6c for rotating the corresponding spindle and magnetic disk, and an index sensor 7a, 7b and 7c for detecting the rotation of the corresponding spindle motor 6a, 6b and 6c. Each disk drive 1a, 1b and 1c also includes a phase locked loop (PLL) 8a, 8b and 8c, for maintaining the phase of the spindle motor 6a, 6b and 6c to keep the motor synchronized with the external synchronizing signal 2. A suitable PLL is described in U.S. Pat. No. 4,870,843 "Parallel Drive Array Storage System". Each magnetic disk drive 1a, 1b and 1c further includes a period detecting circuit 9a, 9b and 9c, for determining whether the rotational period of the corresponding magnetic disk (i.e., the time it takes the disk to complete one rotation) is within a predetermined range on the basis of outputs from the associated index sensor 7a, 7b and 7c.

FIG. 3a shows a more detailed circuit diagram of the period detecting circuit 9a. The other period detector circuits 9b and 9c may be of like construction. The period detector circuit 9a includes an inverter 41 that receives the input signal "IN". The inverter 41 may be implemented using a conventional integrated circuit (IC), like the Texas Instruments 74LS04 chip. The inverted output of the inverter 41 is passed to a re-triggerable single shot multi-vibrator 45. The input signal "IN" is also passed to another retriggerable single shot multi-vibrator 43. The multi-vibrators 43 and 45 may be implemented using the Texas Instruments 74LS123 chip. The non-complementary outputs of the multi-vibrators 43 and 45 are passed to as the D inputs to respective D-type flip-flops 47 and 49. The input signal is tied to the T inputs of the flip-flops 47 and 49. These D-type flip-flops may be implemented using Texas Instruments 74L874 chips.

The non-complementary output from D-type flip-flop 47 is passed to the input of a NOR gate 51. The other input to the NOR gate 51 is the complementary output from the D-type flip-flop 49. This NOR gate 51 may be implemented using the Texas Instruments 74LS00 IC. The output from the NOR gate 51 is complemented by another inverter 53 to generate the output for the period detector circuit 9a.

When the period of the "IN" signal is within the predetermined range of the time $T_0$, the output of the period detector 9a is logically high. However, when the period is greater or less than the time $T_0$, the output of the period detector 9a is logically low. The time period $T_1$ for the first multi-vibrator 43 is equal to 1.1 $T_0$, whereas the time period $T_2$ for the second multi-vibrator 44 is equal to 0.9 $T_0$.

Lastly, each magnetic disk drive 1a, 1b and 1c includes a read-write (R/W) circuit 10 (10a, 10b), for controlling the read and write operations that are performed from/to the associated magnetic disk.

When the rotational periods of the three magnetic disk drives 1a–1c are within a desirable range, "logically high" ready (RDY) signals 11a–11c are provided to an AND circuit 12 in the controller 3 to signal that the rotational period is stable.

Since the conventional disk array system is constructed as described above, the rotation of the respective magnetic disks 4a, 4b and 4c is disturbed by any fluctuations in the external synchronizing signal. More particularly, if the line, over which the external synchronizing signal 2 is carried, becomes opened or shorted or, alternatively, if the period of the external synchronizing signal 2 becomes unstable, the reference signals produced by the phase controllers 8a, 8b and 8c, for controlling the rotation of the disks also fluctuate so that the rotation of the magnetic disks 4a, 4b and 4c is disturbed. Other factors such as noise may contribute to fluctuations in the external synchronizing signal.

Writing and reading operations are adversely affected by the fluctuation in the rotation of the magnetic disks 4a, 4b and 4c so that information is not suitably stored and reproduced to/from the magnetic disks. Further, the position of the magnetic heads 5a, 5b and 5c fluctuate in extraordinary up or down movements during the rotation of the magnetic disks 4a, 4b and 4c, and the magnetic heads may contact the magnetic disks, thereby causing serious damage, such as a head crush.

SUMMARY OF THE INVENTION

The foregoing problems in the prior art are overcome by the present invention in which a disk drive array system includes a plurality of disk drives. Each of the disk drives includes at least one disk for recording information and a detector. The detector monitors the period of an external synchronizing signal that is used for synchronizing rotation of the disk drives. Each disk drive also includes a generator for generating an internal synchronizing signal. A first switch is provided within each of the disk drives for selecting the external synchronizing signal during normal operation and for selecting the internal synchronizing signal when the period of the external synchronizing signal lies outside a predetermined range. Lastly, each disk drive includes a drive mechanism that is responsive to the signal selected by the first switch for controlling rotation of the disk.

The disk drive array system may also include a controller for controlling operation of the drive mechanism. A suitable controller is a phase-locked loop controller.

Each disk drive may additionally include a sensor of sensing the rotation and generating an output indicative of each rotation of the disk and a second detector for monitoring the output of the sensor. Still further, each disk drive may include a second switch for applying the output of the sensor to the first detector when the first switch selects the internal synchronizing signal.

The system monitors the period of the external synchronizing signal to see if the signal lies within an acceptable range. When the external synchronizing signal falls outside the acceptable range, control is switched to the generator that generates an internal synchronizing signal.

BRIEF DESCRIPTION OF THE DRAWINGS

The foregoing features and other aspects of the invention are explained in the following detailed description in connection with the accompanying drawings wherein:

FIG. 1 is a schematic diagram of the prior art disk drive array system;

FIGS. 2a and 2b-1 and 2b-2 are schematic diagrams of a first preferred embodiment of the present invention;

FIG. 3 is a schematic diagram of period detector 9a;

FIGS. 4a–4d are diagrams for explaining how synchronization is performed by the preferred embodiment of the present invention;

FIGS. 5a–5d are timing-diagrams of external synchronizing signal and period detector output in accordance with embodiments of the present invention;

FIGS. 6a and 6b-1 and 6b-2 are schematic diagrams of a second preferred embodiment of the present invention.

DETAILED DESCRIPTION OF THE PREFERRED EMBODIMENTS

Figure 2A:
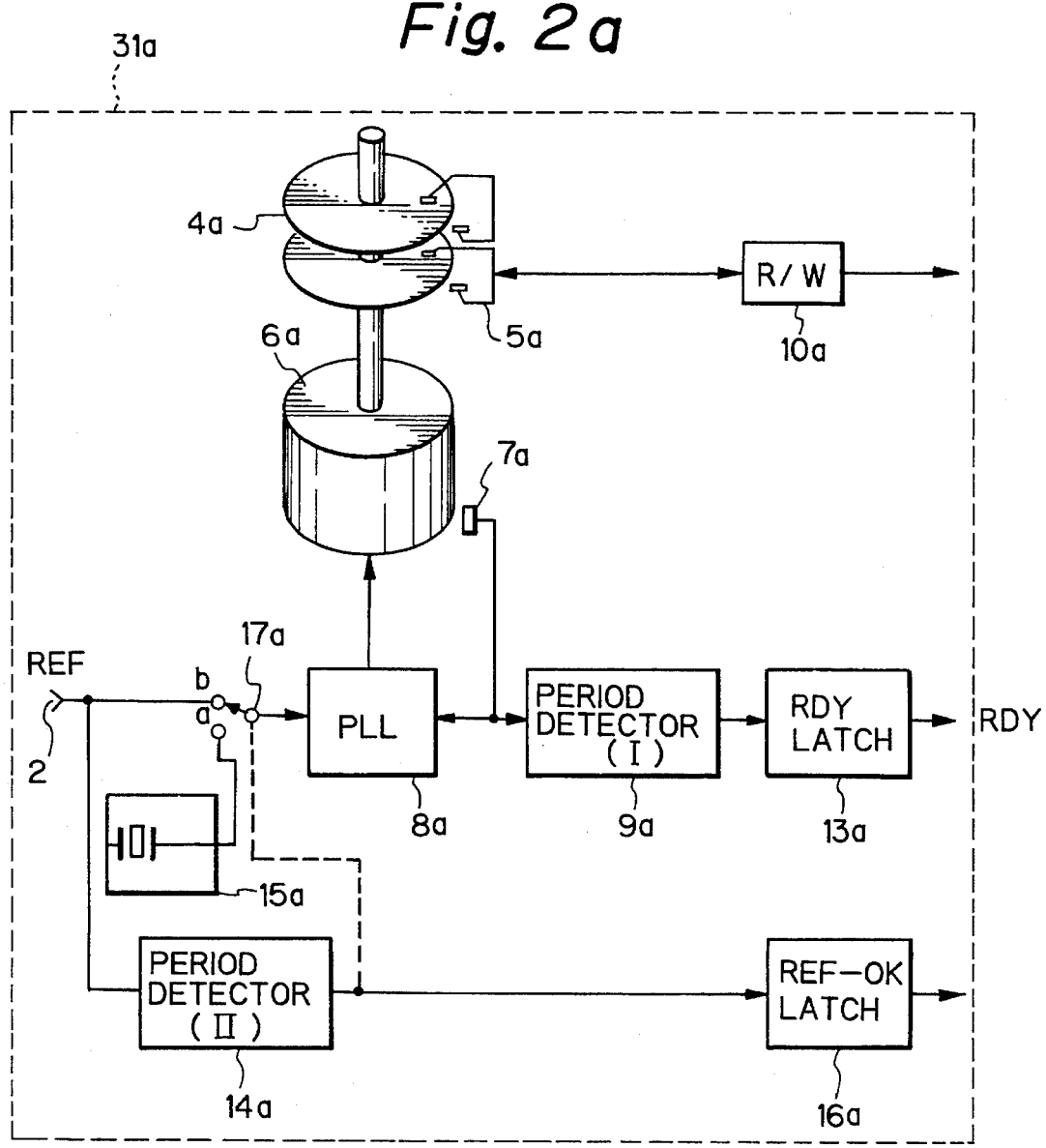
Figures 2, 2B:
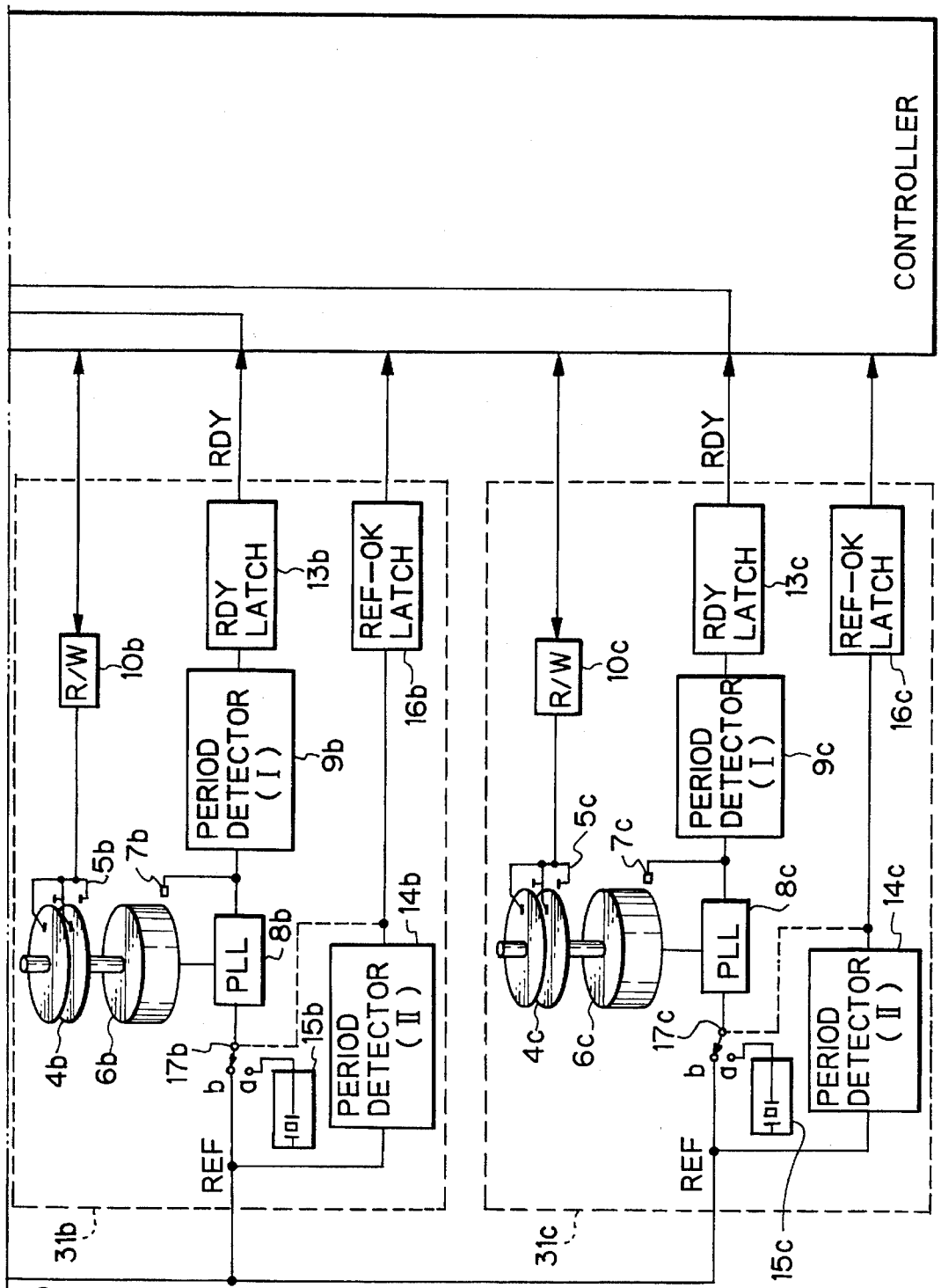

FIG. 2 shows a first preferred embodiment of a magnetic disk drive 31a of the present invention. A plurality of such disk drives 31a, 31b and 31c, as shown in FIG. 2b-1 and 2b-2, may be employed in this embodiment to form a disk drive array system. Each of the disk drives 31b, 31c and 31d may have a construction like that shown in FIG. 2a for disk drive 31a. In FIG. 2a, the magnetic disk drive 31a includes a number of components that are included in the magnetic disk drives 1a, 1b and 1c of the conventional system of FIG. 1. For instance, the magnetic disk drive 31a includes magnetic disks 4a, a spindle motor 6a, for rotating the magnetic disks, and an index sensor 7a, for detecting the rotational period of the disks 4a.

Figure 3:
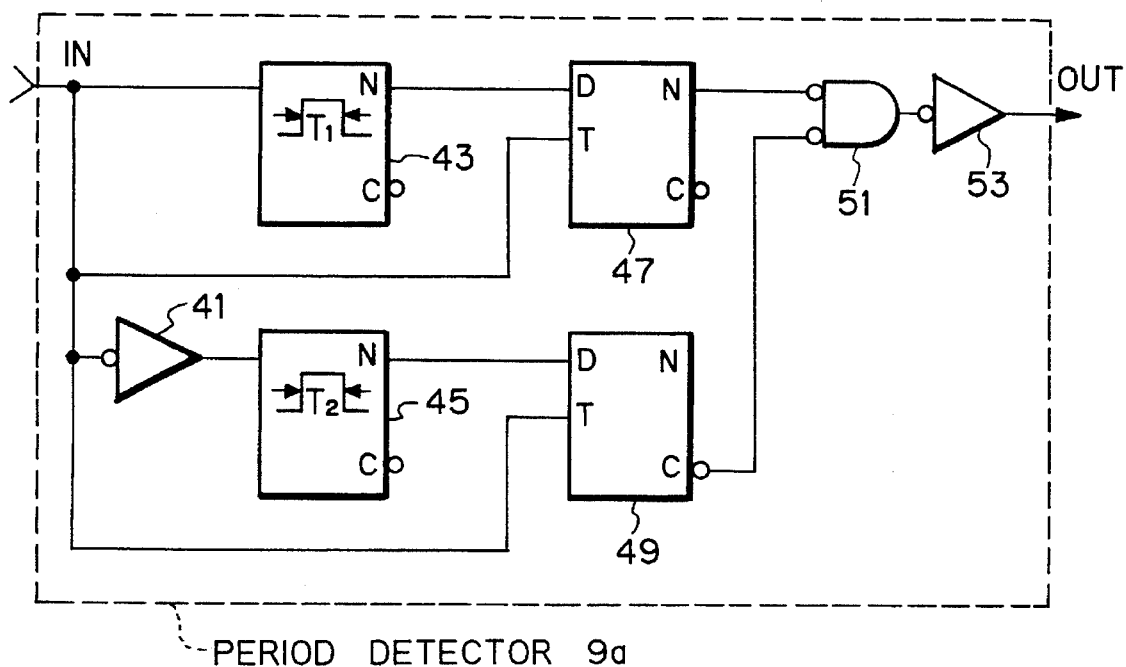
Figure 6A:
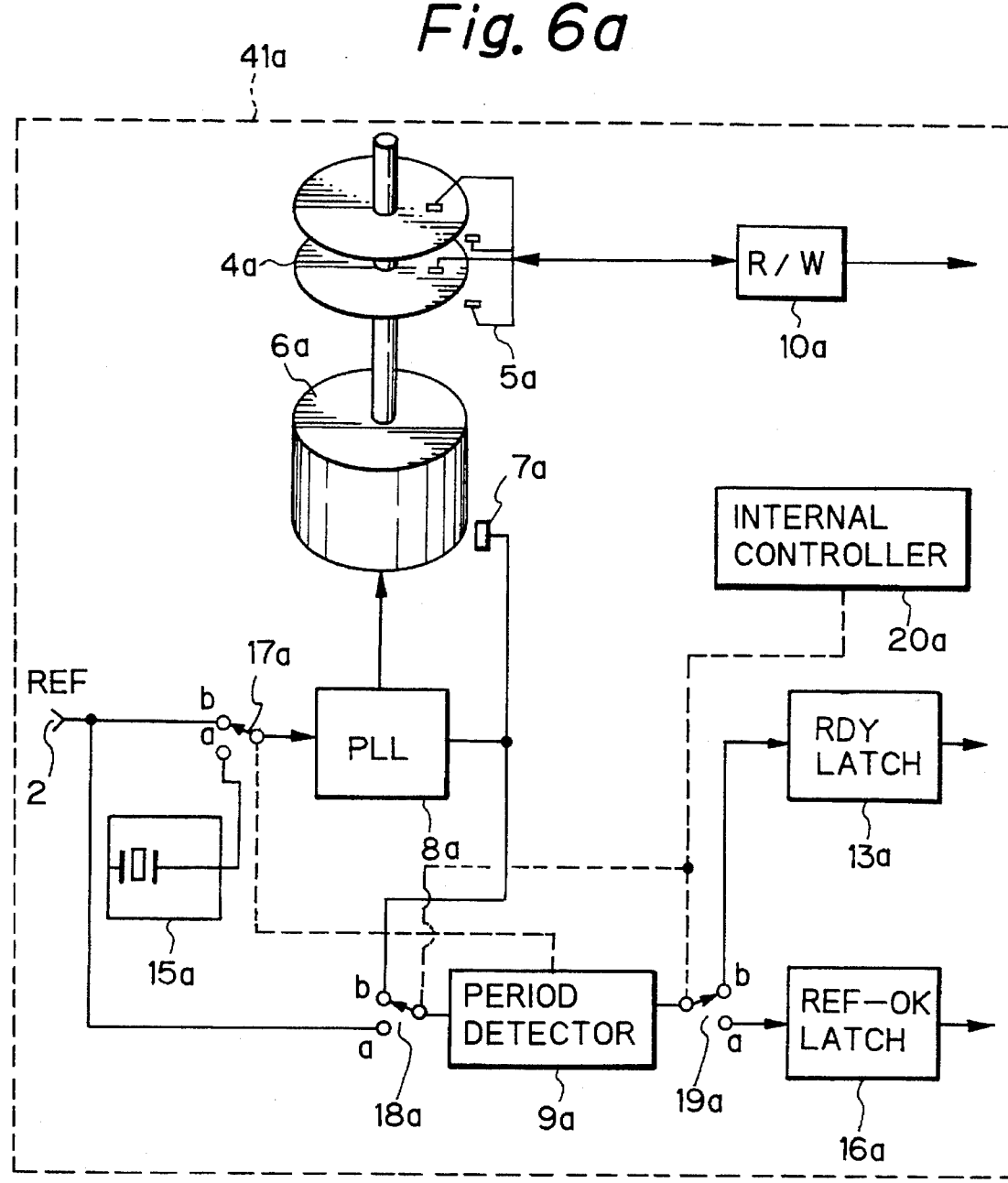
Figures 2, 6B:
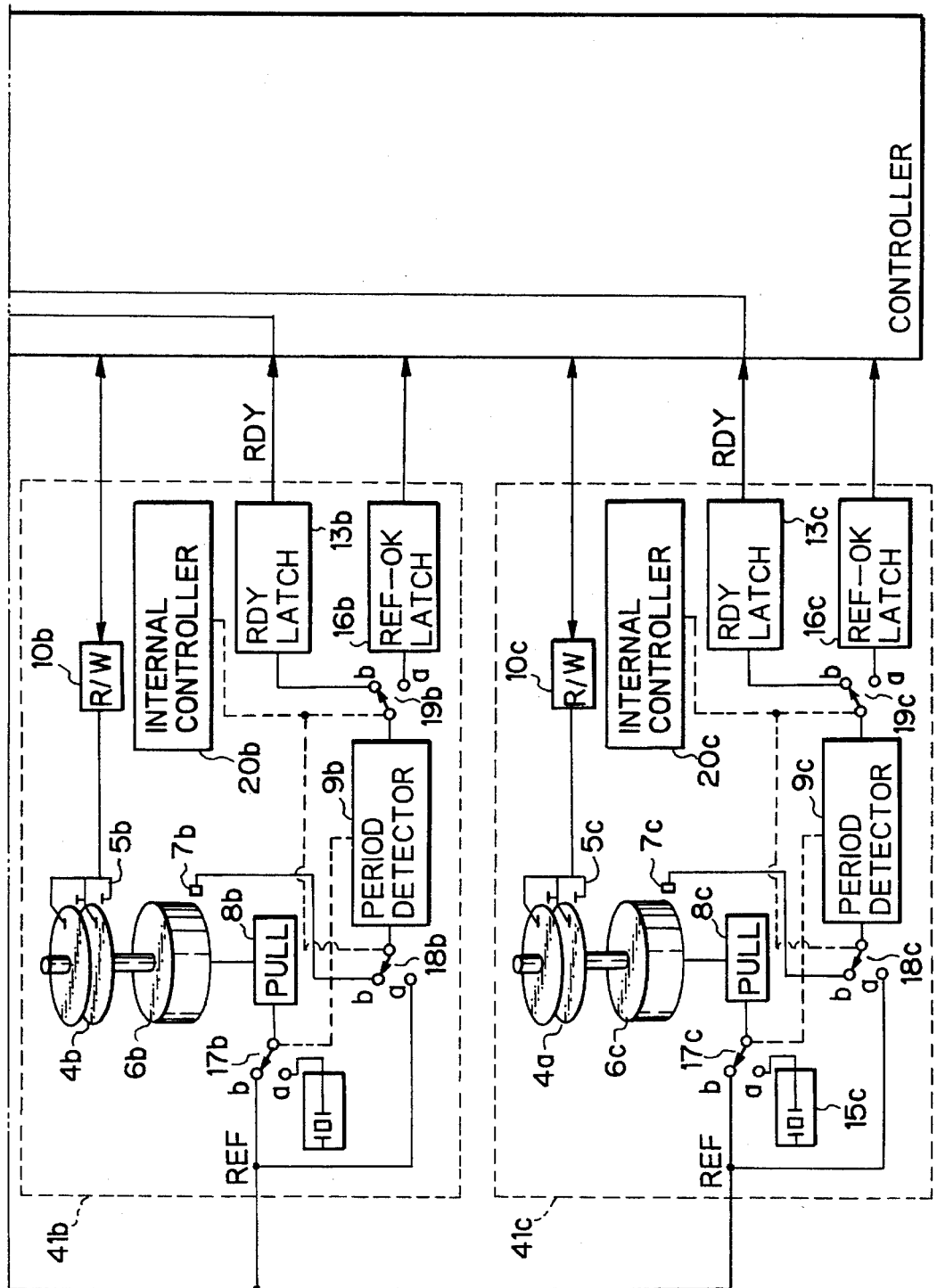

The magnetic disk drive 31a of FIG. 2a, however, differs from the magnetic disk drives 1a, 1b and 1c of FIG. 1 in that it includes a first period detecting circuit 9a for monitoring the rotational period of the magnetic disk 4a, a second period detecting circuit 14a, for monitoring the period of the external synchronizing signal and an internal synchronizing signal generator 15a. The magnetic disk drive 31a of FIG. 2a also includes a phase locked loop (PLL) 8a and a ready latch 13a, which is set open when the rotational period of the disk drive is within an acceptable range. A suitable IC for implementing the ready latch 13a is the Texas Instruments 74LS74. Further, the magnetic disk drive 31a has a reference-OK latch 16a, which is set open when the period of the external synchronizing signal 2 is within a predetermined range. The reference-OK latch 16a may be implemented using the same hardware as is used in the ready latch 18a. The disk drive 31a additionally includes a switch 17a for selecting the external signal 2 or the internal signal 15a, in accordance with the output of the second period detecting circuit 14a. Both of the period detector circuits 9a and 14a may have a construction like that of the conventional system shown in FIG. 3.

During normal operation, the period of the external synchronizing signal 2 is within a predetermined range. The predetermined range corresponds to the range within ±1% of the rated period of the disk drive 31a. In FIG. 4a, the period $T_0$ of the external synchronizing signal is within the predetermined range. The PLL 8a (FIG. 2a) keeps its output signal in phase with the reference signal 2. FIG. 4b shows a timing diagram of the output of the index sensor 7a (FIG. 2a) when the system is operating in synchronization. FIG. 4c shows a timing diagram of the output of the index sensor 7a (FIG. 2a) when the output is phase shifted ahead of the phase of the external synchronizing signal 2, and FIG. 4d shows a timing diagram of the index sensor output when the output is phase shifted behind the phase of the external synchronizing signal. When the output of the index sensor 7a (FIG. 2a) leads the external signal 2 in phase by $T_L$ as shown in FIG. 4c or the output of the index sensor 7a (FIG. 2a) lags the signal 2 by $T_D$ as shown in FIG. 4d, the synchronization is maintained by the PLL 8a provided that $T_L$ and $T_D$ are within the predetermined range. If the period of the output of the index sensor 7a is within the predetermined range, the ready latch 13a is set by the first period detector 9a. If the detected period is leaving the predetermined range, the first period detector 9 resets the RDY latch 13a.

If an abnormal condition appears in the external synchronizing signal 2, such as the signal 2 lags its normal phase by a greater than predetermined quantity (such as lagging by 50 microseconds), as shown in FIG. 5a, or the external synchronizing signal 2 leads its normal phase by a greater than predetermined quantity (such as leading by 50 microseconds) as shown in FIG. 5c, the second period detecting circuit 14a (FIG. 2a) produces (at $P_1$ and $P_2$ in FIGS. 5b and 5d) an output signal to switch 17a (FIG. 2a) that causes the switch to move its contact from the position "b" to position "a" After the transfer of the switch 17a (FIG. 2a) contact, the internal synchronizing signal generator 15a supplies the PLL 8a with a reference signal that serves as the synchronizing signal. The period detector circuit 14a produces an output that resets the reference-OK latch 16a, which had been set before the circuit 14a detected the abnormal condition of the signal 2.

Thus, even if the external synchronizing signal becomes irregular, the respective magnetic disk drive of the disk array can operate in accordance with the internal synchronizing signal so that reading and writing operations may be continued, although the parallel operation of the disk drive array using a common reference signal is not available. With such arrangement, since data or information is not lost even if an abnormal condition occurs in the external synchronizing signal, the reliability of the disk drive array system is improved.

FIGS. 6a and 6b-1 and 6b-2 show a second preferred embodiment of the present invention. The second embodiment will be described in detail with reference particularly to FIG. 6a, which shows disk drive 41a, which is one of the three disk drives 41a, 41b and 41c that are included in this second preferred embodiment. Disk drives 41b and 41c (FIG. 6b-2) may have a construction like disk drive 41a. This embodiment is similar to the first preferred embodiment shown in FIGS. 2a and 2b, except the second preferred embodiment uses only one period detector 9a (see FIG. 6a). More particularly, the period detector 14a (FIG. 2a) is eliminated and switches 18a and 19a (FIG. 6a) are added. An internal controller 20a is provided to control switches 18a and 19a. The period detector 9a may be implemented using a circuit like that shown in FIG. 3. When the contact of the switch 18a is positioned to touch the side "b", the period detector 9a monitors the output of the index sensor 7a, whereas when the contact is connected to side "a", the period detector 9a monitors the external synchronizing signal 2. The set/reset operation for ready latch 13a and reference-OK latch 16a is performed in a fashion like that described for the first preferred embodiment.

The outputs of the respective ready latches 13a, 13b and 13c (FIG. 6b-1 and 6b-2) included in the disk array system are supplied to an AND circuit 12 of the controller 3. The outputs of the respective reference-OK latches 16a, 16b and 16c are also supplied to an AND circuit (not shown) of the controller 3. The outputs of those AND circuits are used for determining whether the disk array system is operating properly.

During normal operation, switch 17a (FIG. 6a) is thrown to side "b" to supply PLL 8a with the external synchronizing signal. Switch 18a is thrown to the side "a" to supply the external synchronizing signal 2 to period detector 9a, and switch 19a is thrown to side "a" to provide the output of the period detector to the reference-OK latch 16a.

If an abnormal or irregular condition occurs in the external synchronizing signal 2, the switches 17a and 18a are shifted so that the contact of switch 17a is connected to side "a", the contact of switch 18a is connected to side "b", and the contact of switch 19a is connected to side "b". The switching of switch 17a to contact "a" causes the internal synchronizing signal from generator 15a to be supplied to PLL 8a to control the rotation of spindle motor 6a. Moreover, the switching of the contact of switch 18a to side "b" causes the output of index sensor 7a to be monitored by the period detector 9a, which is monitoring the external synchronizing signal 2. Lastly, the switching of the contact of switch 19a to side "b" causes the output of the period detector to be passed to ready latch 13a.

Thus, the rotation of magnetic disks 4a, 4b and 4c in the respective disk drives of the disk drive array system are usually synchronized by a common external synchronizing signal as if all of the disk drives were a single disk drive. Even if the synchronized rotation of the disks is not possible due to the irregularity of the external signal, the loss of data can be avoided by replacing the external signal with the internal reference signal.

Figure 7A:
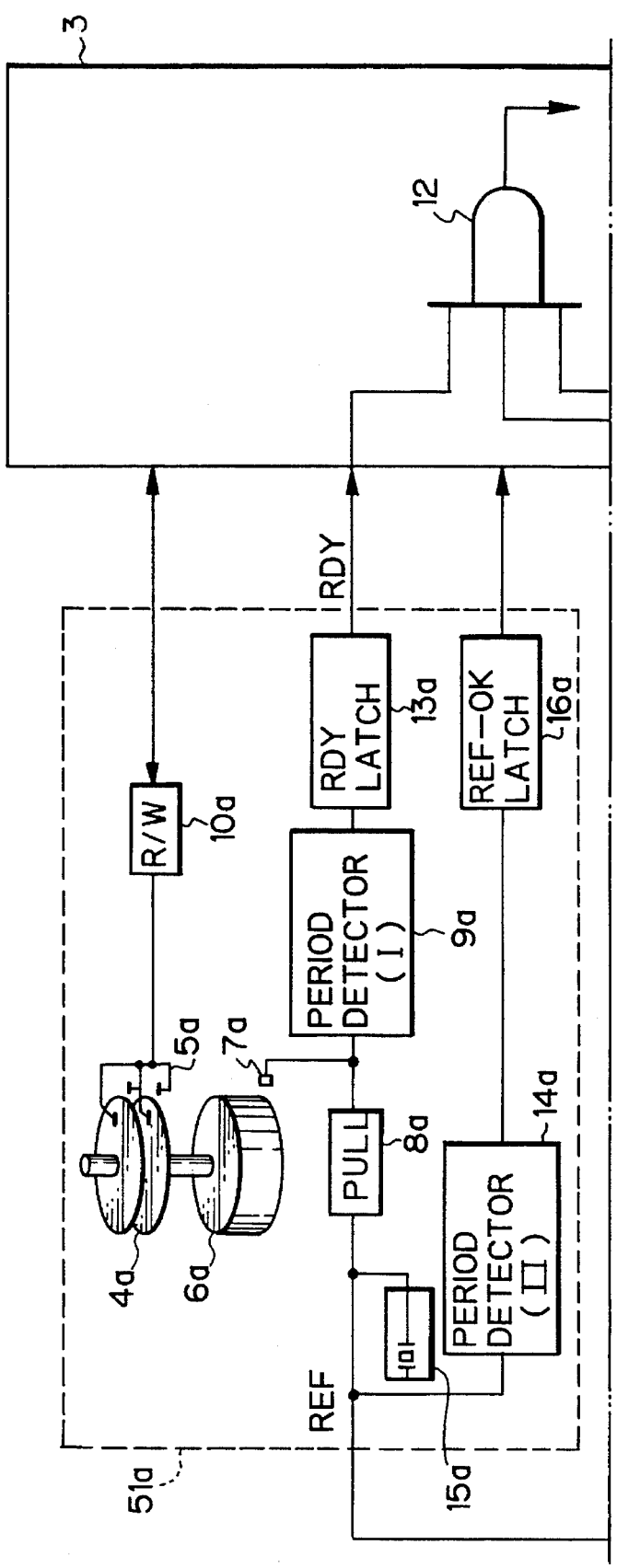
FIG. 7a–b is a schematic diagram of a third preferred embodiment of the present invention.
Figure 7B:
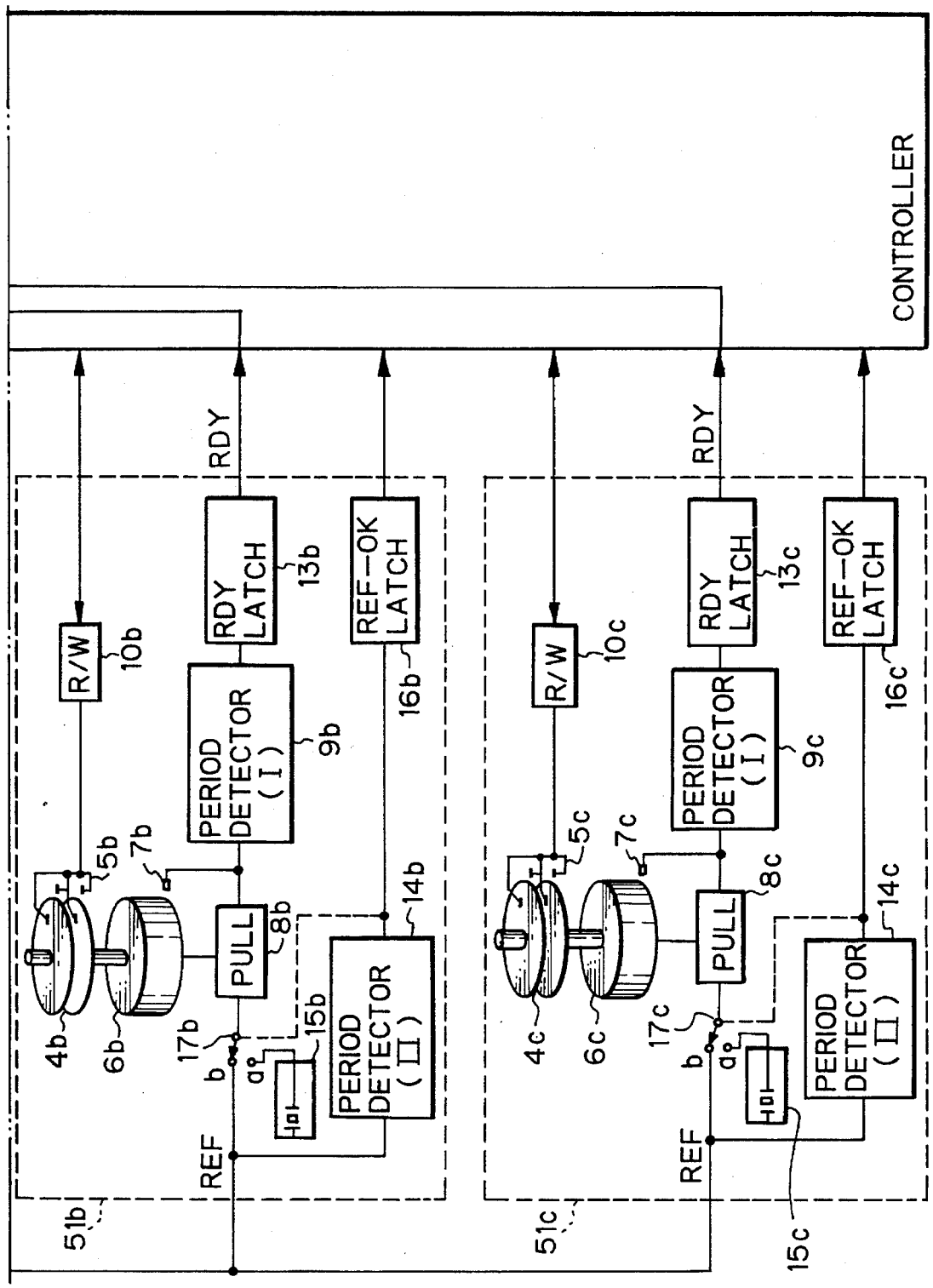

FIG. 7 shows a third preferred embodiment of the present invention. This third preferred embodiment is much like the previously described first embodiment. Disk drive 51a differs from disk drives 51b and 51c in this third embodiment. In particular, disk drives 51b and 51c include switches 17b and 17c, respectively, like counterpart switches provided in the first embodiment of FIG. 2. Disk drive 51a, however, does not include a switch 17a, as is provided in FIG. 2. Rather, the output of the internal synchronizing signal generator 15a is used as the reference signal within disk drive 51a. The external synchronizing signal 2 is not used. Magnetic disk drive 51a is used as a master disk drive for the two slave drives 51b and 51c. In other words, the internal synchronizing signal generator 15a provides the reference signal for the other disk drives 51b and 51c.

In the described preferred embodiments, the period detectors 9a, 9b and 9c and 14a, 14b and 14c may be constructed by discrete electronic devices or a microprocessor, to measure the time periods for monitoring signals. Also, the switches 17a, 17b and 17c and 18a, 18b and 18c may be mechanical switches or formed from electronic circuits.

On the basis of the described preferred embodiments of the invention, it will be apparent to those skilled in the art that many changes and modifications may be made without departing from the concepts of the invention.

What is claimed is:

1. A disk drive array system having a plurality of disk drives each disk drive of the plurality of disk drives comprising:

at least one disk for recording information;

a first detector having an output, directly receiving an external synchronizing signal, for monitoring the period of the external synchronizing signal that is used for synchronizing rotation of the disk drives, and controlling the output to indicate when the period of the external synchronizing signal lies outside a predetermined range;

a generator for generating an internal synchronizing signal;

a first switch, receiving the internal synchronizing signal, the external synchronizing signal, and the output of the first detector, such that the first switch selects the external synchronizing signal when the output of the first detector indicates that the period of the external synchronizing signal does not lie outside the predetermined range, and selects the internal synchronizing signal when the output of the first detector indicates that the period of the external synchronizing signal lies outside the predetermined range; and a drive mechanism that is responsive to the signal selected by said first switch for controlling the rotation of the disk.

2. A system as recited in claim 1 wherein each disk drive includes only one disk.

3. A system as recited in claim 1 wherein each disk drive includes multiple disks.

4. The system as recited in claim 1, further comprising a controller for controlling operation of the drive mechanism.

5. The system as recited in claim 4 wherein said controller comprises a phase-locked loop.

6. The system as set forth in claim 1, wherein each disk drive further comprises a sensor means for sensing the rotation of the disk and for generating an output indicative of each rotation, said disk drive further including a second detector for monitoring the period of the indicative output.

7. The system as set forth in claim 6 wherein the first detector comprises a multivibrator circuit and the second detector comprises a multivibrator circuit.

8. The system as set forth in claim 1 wherein the first detector comprises a multivibrator circuit.

9. A disk drive array system having a plurality of disk drives, each disk drive of the plurality of disk drives comprising:

at least one disk for recording information;

a generator for generating an internal synchronizing signal;

a sensor for sensing the rotation of the disk and generating an output indicative of each rotation of the disk;

a first switch, receiving an external synchronizing signal and the output from the sensor;

a second switch, receiving the external synchronizing signal and the internal synchronizing signal;

a first detector having an input connected to an output of the first switch, said first detector having means for detecting whether the period of its input signal lies outside a predetermined range and having means for providing an indicative signal if the period of the input lies outside the predetermined range, said first detector also having means for causing the second switch to select the internal synchronizing signal upon the first detector detecting whether the period of its input signal lies outside a predetermined range;

a switch controller means, receiving the indicative signal, for controlling the first switch such that the first switch is initially controlled to select the external synchronizing signal and upon receiving the indicative signal the switch controller means causes the first switch to select the output from the sensor; and a drive mechanism that is responsive to the signal selected by said second switch for controlling the rotation of the disk.

10. A system as recited in claim 9 wherein each disk drive includes only one disk.

11. A system as recited in claim 10 wherein each disk drive includes multiple disks.

12. The system as set forth in claim 9 wherein the first detector comprises a multivibrator circuit.

13. The system as set forth in claim 9 further comprising a third switch controlled by the switch controller means, said third switch connecting the output of said first detector to a first and a second storage element.

14. In a disk drive array system having a plurality of disk drives and a means for generating an external synchronization signal for synchronizing operation of the respective disk drives, a method of ensuring synchronization of tile disk drives comprising the steps of:

monitoring the period of the external synchronizing signal to determine whether the external synchronizing signal is within an acceptable range; and providing an internally generated synchronization signal that is generated by an internal generator in the respective disk drives when it is determined that the external synchronizing signal is outside the acceptable range.

15. In a disk drive array system having a plurality of disk drives and a means for generating an external synchronization signal for synchronizing operation of the respective disk drives, a method of ensuring synchronization of the disk drives comprising the steps of:

providing an internally generated synchronizing signal that is generated by an internal generator in the respective disk drives;

monitoring the period of the external synchronizing signal to determine whether the external synchronizing signal is within a predetermined range; and when it is determined that the external synchronizing signal is outside the predetermined range, switching the disk drive that detected the external synchronizing signal as being outside an acceptable range to the internally generated synchronizing signal and then monitoring the period of the rotation of the disk drive to determine whether the rotation of the disk drive is within the predetermined range.

16. A disk drive array system having a plurality of disk drives each disk drive of the plurality of disk drives comprising:

at least one disk for recording information;

a first detector, directly receiving an external synchronizing signal, for monitoring the period of the external synchronizing signal that is used for synchronizing rotation of the disk drives, the first detector asserting a control signal when said first detector detects that the period of the external synchronizing signal lies outside a predetermined range;

a generator for generating an internal synchronizing signal;

a first switch, receiving the internal synchronizing signal, the external synchronizing signal, and the control signal, said first switch having two states such that when the control signal is asserted the internal synchronizing signal is provided as an output of the first switch and when the control signal is unasserted the external synchronizing signal is provided as the output of the first switch;

a drive mechanism that is responsive to the output signal selected by said first switch for controlling the rotation of the disk.

17. In a disk drive array system having a plurality of disk drives and a means for generating an external synchronization signal for synchronizing operation of the respective disk drives, means for ensuring synchronization of the disk drives, wherein the means for ensuring synchronization of the disk drives further comprises:

means for providing an internally generated synchronizing signal;

means for monitoring the period of the external synchronizing signal to determine whether the external synchronizing signal is within a predetermined range;

means, responsive to the means for monitoring, for switching the disk drive that detected the external synchronizing signal as being outside the predetermined range to the internally generated synchronizing signal, and for monitoring the period of the rotation of the disk drive to determine whether the rotation of the disk drive is within the predetermined range.

18. In a disk drive array system having a plurality of disk drives and a means for generating an external synchronizing signal for synchronizing operation of the respective disk drives, means for ensuring synchronization of the disk drives by providing a synchronizing input to a drive means for driving the plurality of disk drives, wherein the means for ensuring synchronization of the disk drives further comprises:

means for internally generating a synchronizing signal;

means for monitoring the period of the external synchronizing signal to determine whether the period of the external synchronizing signal is outside a predetermined range; and means, responsive to the means for monitoring, for providing the internally generated synchronizing signal to the drive means when the means for monitoring determines that the period of the external synchronizing signal is outside the predetermined range, and for providing the external synchronizing signal to the drive means when the means for monitoring determines that the period of the external synchronizing signal is not outside the predetermined range.

* * * * *